United States Patent [19]

Varanakis

[11] Patent Number: 4,720,029

[45] Date of Patent: Jan. 19, 1988

[54] FOLDING CHAIR/BACKPACK

[76] Inventor: John E. Varanakis, 762 E. 8125 South, Sandy, Utah 84070

[21] Appl. No.: 894,906

[22] Filed: Aug. 8, 1986

[51] Int. Cl.[4] .............................................. A45F 4/02
[52] U.S. Cl. .................................... 224/155; 224/151
[58] Field of Search .................... 224/151, 155; 297/1, 297/188, 129

[56] References Cited

U.S. PATENT DOCUMENTS

| | | | |
|---|---|---|---|
| 2,480,402 | 8/1949 | Elston | 297/129 |
| 2,836,334 | 5/1958 | Davis . | |
| 3,151,909 | 10/1964 | Gerdetz | 224/155 X |
| 3,266,686 | 8/1966 | Griffith . | |
| 3,292,830 | 12/1966 | Mack | 224/155 |
| 3,368,725 | 2/1968 | Martin | 224/155 |
| 3,912,138 | 10/1975 | Pava . | |
| 4,300,707 | 11/1981 | Kjaer | 297/129 X |
| 4,362,307 | 12/1982 | Nakatani . | |
| 4,487,345 | 12/1984 | Pierce et al. | 224/155 |
| 4,530,451 | 7/1985 | Hamilton . | |
| 4,577,901 | 3/1986 | Phillips | 224/155 X |
| 4,582,165 | 4/1986 | Latini | 224/155 X |

Primary Examiner—Henry J. Recla
Assistant Examiner—Robert M. Petrik
Attorney, Agent, or Firm—Fleit, Jacobson, Cohn & Price

[57] ABSTRACT

A folding low seat chair is provided including opposite side arm portions and adjustable length shoulder strap loops supported therefrom whereby the chair, when unfolded, may be supported from the back of a user and utilized as a backpack frame for supporting relatively heavy and large bulk loads. The chair/backpack frame is constructed in a manner such that the weight of a person seated on the chair or a load supported therefrom when being used as a backpack frame serves to retain the chair in an unfolded position. Further, the back engaging portions of the chair and backpack frame are such that comfort and air circulation is afforded between the backpack frame and the user.

10 Claims, 7 Drawing Figures

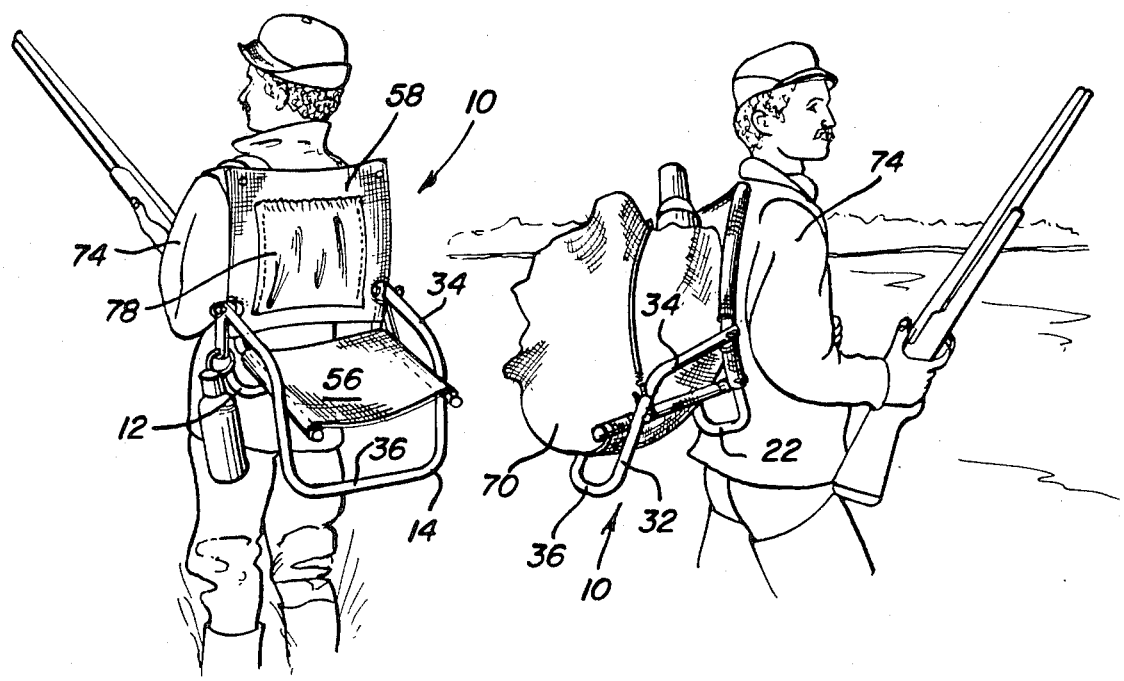
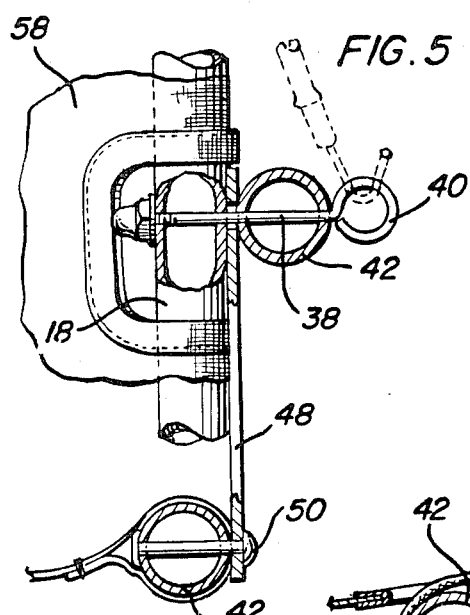
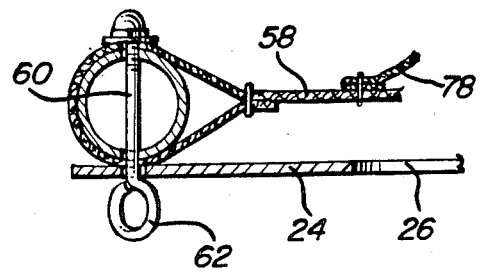
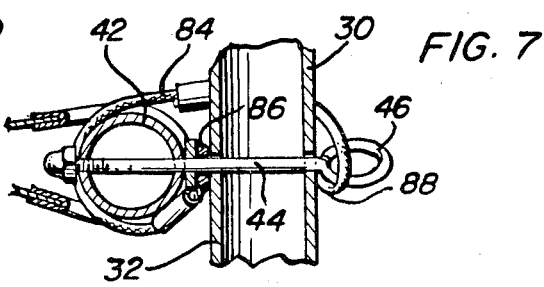

FOLDING CHAIR/BACKPACK

BACKGROUND OF THE INVENTION

1. Field of the Invention

A folding chair is provided for low level seating and is structured in a manner whereby the chair, when unfolded, also may be used as a backpack frame and have considerable loads supported therefrom.

2. Description of Related Art

Various different forms of folding and collapsing chairs and backpack frames heretofore have been provided such as those disclosed in U.S. Pat. Nos. 2,836,334, 3,266,686, 3,292,830, 3,912,138, 4,300,707, 4,362,307 and 4,530,451. However, these various forms of folding and collapsible chairs and backpack frames do not include the overall combination of structural features of the instant invention which particularly well coact to provide a low level chair and a backpack frame capable of supporting relatively heavy loads and wherein the chair/frame is equipped with armrests and may be folded into a compact state. In addition, the chair/backpack frame includes structural features which enable backpack loads to be readily removably anchored thereto.

SUMMARY OF THE INVENTION

The chair/backpack frame of the instant invention is constructed in a manner to define a low level seat including armrests and is structured to also function as a backpack frame. Further, the chair/backpack frame is foldable into a compact state and is equipped with various anchor points to which the ends or mid-portions of elongated backpack load tie-down members may be anchored. Also, the chair/backpack frame is composed of only two frame sections and a seat panel and seat panel supporting structure mounted from one of the frame sections and a backrest panel supported from the other of the frame sections.

The main object of this invention is to provide a combined chair and backpack frame.

Another object of this invention is to provide a combined chair and backpack frame of the foldable type.

Still another important object of this invention is to proide a combined chair and backpack frame in accordance with the preceding objects and defining a low level seat.

A further object of this invention is to provide an apparatus which, when in use as a backpack frame, may be conveniently supported upon the back of the user through the utilization of shoulder straps and with the apparatus including user engaging surfaces which conform to the transverse shape of the user's back.

Yet another object of this invention is to provide a backpack frame which facilitates spacing the lower portion of the frame and load supporting portion thereof away from the back of the user for air circulation between the user's back and the frame.

A further object of this invention is to provide a combined chair and backpack frame utilizing a flexible panel for the backrest portion of the chair which also functions to support a considerable portion of the load being carried from the back of the user when the apparatus is used as a backpack frame to thereby increase the comfort encountered when carrying a heavy load.

A still further object of this invention is to provide a backpack frame designed to support a considereable portion of the attendant load from the hips of the user.

Yet another important object of this invention is to provide a combined collapsible chair and backpack frame which may be folded in a manner so as to define a sled-type apparatus whereby heavy loads may be skidded over the ground or ground cover such as snow.

A final object of this invention to be specifically enumerated herein is to provide a combined chair and backpack frame in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the combined folding chair and backpack frame of the instant invention mounted upon the back of a user and as seen from a position to the rear and left of the user;

FIG. 2 is a side perspective view of the user and combined chair and backpack frame as seen from the right side of the user;

FIG. 5 is an enlarged fragmentary vertical view taken substantially upon the plane indicated by the section line 5—5 of FIG. 3;

FIG. 6 is an enlarged fragmentary horizontal sectional view taken substantially upon the plane indicated by the section line 6—6 of FIG. 3; and FIG. 7 is an enlarged fragmentary vertical sectional view taken substantially upon the plane indicated by the section line 7—7 of FIG. 4.

DESCRIPTION OF THE PREFERRED EMBODIMENT

Figure 3:
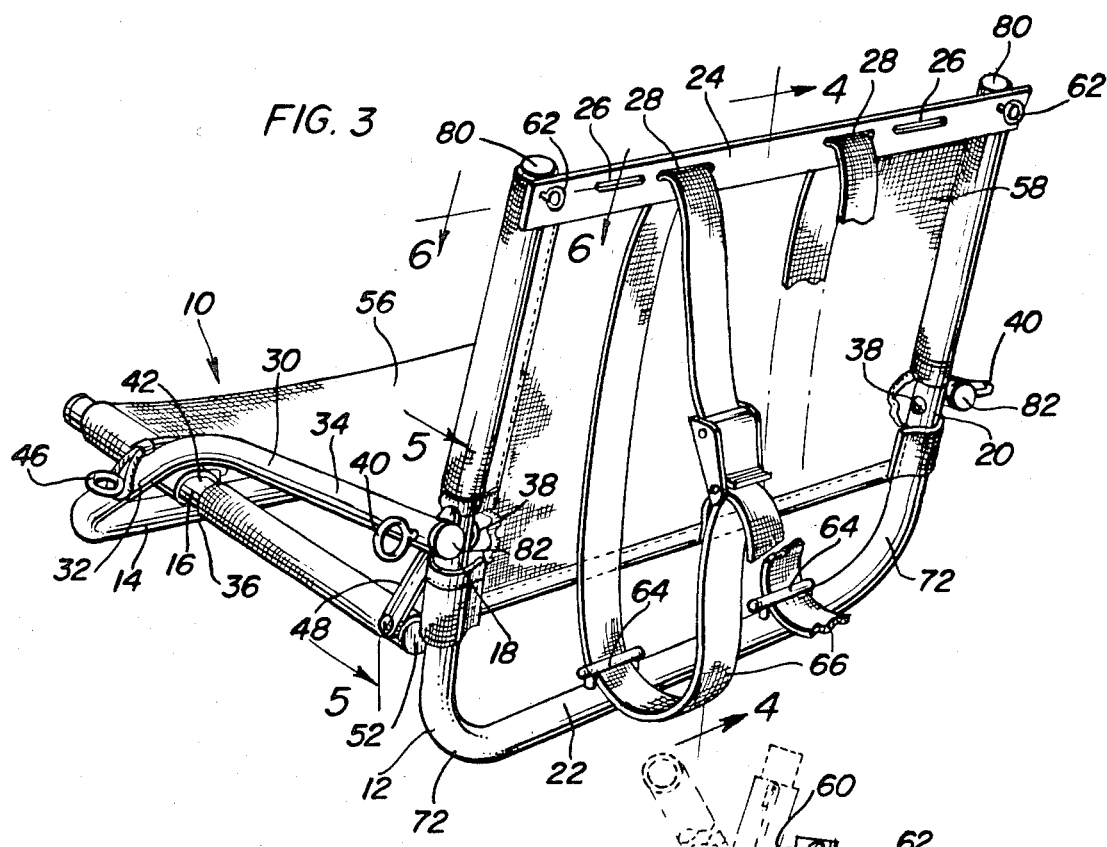
FIG. 3 is a left side rear perspective view of the combined chair and backpack frame.

Referring now more specifically to the drawings, the numeral 10 generally designates a folding chair/backpack frame structure constructed in accordance with the present invention and including first and second frame members 12 and 14 as well as seat frame means or structure 16. The first frame member 12 includes a pair of first elongated and generally parallel upright opposite side members 18 and 20 interconnected at their lower end portions by an integral first lower transverse member 22 extending between and interconnecting the lower ends of the side members 18 and 20. The upper ends of the side members 18 and 20 are interconnected by an upper transverse member 24 extending and secured therebetween, the transverse member 24 being in the form of a horizontally elongated edge upstanding slightly horizontally flexive strap member having first and second pairs of slots 26 and 28 formed therein and extending longitudinally therealong.

The second frame member 14 includes second elongated, generally parallel and front-to-rear extending and rearwardly and upwardly inclined opposite side members 30 each including integral realtively angulated front and rear end portions 32 and 34 defining a rearwardly and downwardly opening included angle of less than 180°. A second lower transverse member 36 extends between and interconnects the forward ends of the front-to-rear extending second side members 30 and the latter are spaced apart to receive the first side members 18 and 20 therebetween. The rear ends of the rear end portions 34 are pivotally anchored by pivot fastening means 38 to the outer sides of the side members 18 and 20 for oscillation relative thereto, the pivot fastener means 38 including anchor eyes 40 disposed on the outer sides of the rear end portions 34.

The seat frame means or structure 16 includes a pair of elongated opposite side front-to-rear extending side marginal members 42 disposed immediately inward of the side members 30 and forward end portions of the side marginal members 42 are anchored, by pivot fasteners 44, to the inner sides of the forward end portions 32 of the side members 30, the pivot fasteners 44 including anchor eyes 46 on the outer sides of the forward end portions 32. Anchor means in the form of a pair of connecting links 48 have one pair of corresponding ends pivotally anchored as at 50 to the rear ends of the side marginal members 42 and the other pair of corresponding ends pivotally anchored to the side members 30 as well as the side members 18 and 20 by the pivot fastener means 38. In normally usage of the structure 10, there is no pivotal movement between the side marginal members 42 and the forward end portions 32 or the connecting links 48.

The rear ends of the side marginal members 42 are closed by caps 52 which abut the forward sides of the side members 18 and 20 intermediate rear end portions 34 of the side members 30 and the lower ends of the side members 18 and 20. A flexible seat panel 56 extends between and is supported from the side marginal members 42 while a flexible backrest panel 58 extends between and is supported from the uper end portions of the side members 18 and 20.

The opposite ends of the transverse member 24 are secured to the upper ends of the side members 18 and 20 through the utilization of fasteners 60 including anchor eyes 62 projecting from the rear side of the transverse member 24 and the transverse member 22 includes elongated anchor guides 64 through which a pair of adjustable length shoulder straps 66 are longitudinally slidably received, the shoulder straps 66 also being slidably received through either the slots 26 or the slots 28.

Figure 4:
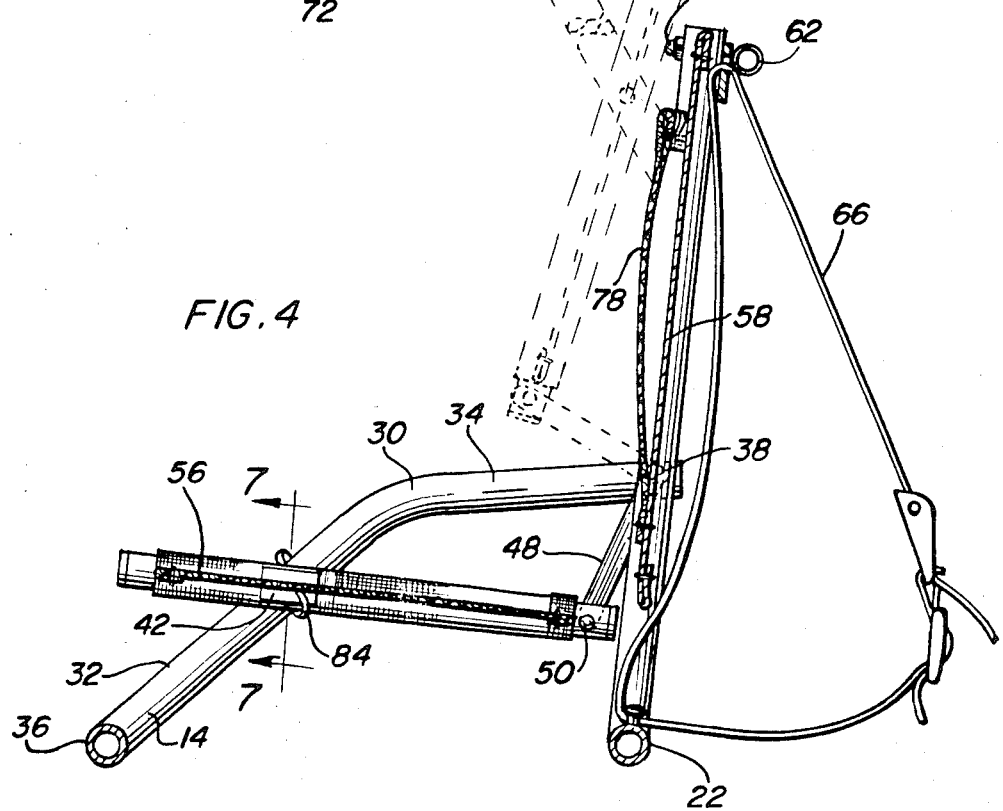
FIG. 4 is a vertical sectional view taken substantially upon the plane indicated by the section line 4—4 of FIG. 3.

As may best be seen from FIG. 4 of the drawings, the second frame member 14 and side marginal members 42 may be swung upwardly about the pivot fastener means 38 relative to the frame member 12 to the dotted line positions thereof illustrated in FIG. 4. This enables the structure 10 to be stored in a compact state or to be carried on the user's back, when not loaded with equipment, in a compact manner.

From FIGS. 1, 2, 5 and 7 it will be noted that various equipment or equipment retaining strap means may be suspended from the anchor eyes 40 and 46. In addition, the eyes 62 may be utilized in the same manner. Also, it may be seen from FIG. 2 that a considerable volume load 70 may be supported from the structure 10 when the latter is in the open position and utilized as a backpack frame. The transverse member 24 is slightly flexive so as to conform more closely to the transverse curvature of the user's upper back and the curved integral portions 72 joining the lower ends of the side members 18 and 20 with the opposite ends of the transverse member 22 as well as the transverse member 22 itself allows a substantial portion of the weight of the load 70 supported from the structure 10 to rest upon the hips of the user 74. Still further, the flexible backrest panel 58 is reasonably tensioned, but not excessively tensioned, and the lower marginal edge thereof is spaced above and rearward of the rear marginal edge of the seat panel 67 and allows air circulation between a major portion of the rear side of the panel 58 and the back of the user 74.

The front side of the backrest panel 58 includes a flexible upwardly opening pocket defining panel 78 and the upper ends of the side members 18 and 20 are capped as at 80 while the rear end portions 34 of the side member 30 are capped as at 82.

With attention now invited more specifically to FIGS. 3 and 7, it will be seen that a length of cable 84 is provided adjacent each pivot fastener 44 and includes a loop 86 on one end disposed between the corresponding side member 30 and marginal member 42 and through which the pivot fastener 44 extends. The cable 84 then passes about marginal member 42, over the latter and across the front side of the corresponding side member 30 and includes an enlarged loop 88 on its other end removably engaged over the corresponding anchor eye 46.

In the event the user 74 hunts and kills large game, and wishes to transport the carcass over snow covered ground, the pivot fasteners 44 may be removed after the loops 88 have been disengaged from the anchor eyes 46 and the rear ends of the marginal members 42 may be swung to positions above the the rear end portions 34 of the side member 30, after which the pivot fasteners 44 may be reinstalled. In this manner, the frame 14 may be swung in the opposite direction toward a collapsed position with the rear end portions 34 generally paralleling the lower ends of the side members 18 and 20 and the marginal members 42 generally paralleling the forward end portions 32 of the side members 30. In this position, the panel 56 is inclined relative to the panel 58, the structure 10 is elongated in the collapsed position and the thus collapsed structure 10 may be used as a sled with the inclined panel 56 serving as a bow panel for the sled. Furthermore the side members 30 also serve as ground runners when in the sled position.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A folding chair/backpack frame structure including first and second frame members and seat frame means, said first frame member being disposed in upstanding position, having front and rear sides and defining a backrest and a reat leg assembly, said second frame member being generally horizontal and defining opposite side armrests and a front leg assembly, said first frame member including first elongated and generally parallel upright opposite side members, a first lower transverse member extending between and interconnecting the lower end portions of said first side members and an upper transverse member extending between and interconnecting the uppre end portions of said first side members, said second frame member including second elongated, generally parallel, front-to-rear extending and rearwardly and upwardly inclined arm rest defining opposite side members, said second side members each including integral relatively angulated front and rear end portions defining a rearwardly and downwardly opening included angle of less than 180°, a second lower transverse member extending between and connecting the front end portions of said front-to-rear extending second side members, said second side members being spaced apart to receive said first side members therebetween, pivot means pivotally anchoring the rear ends of said second opposite side members to the outer sides of the corresponding first side members centrally intermediate said first frame member upper and lower transverse members for oscillation of said second opposite side members relative to said first frame member about aligned horizontal transverse axes, said seat frame means being horizontally disposed and including a pair of elongated opposite side front-to-rear extending side marginal members and a seat panel extending therebetween and supported therefrom, means anchoring forward portions of said side marginal members spaced rearward of the forward ends thereof between said front end portions of said second opposite side members centrally intermediate the upper and lower extremities of said front end portions and above said second lower transverse member, anchor means anchoring the rear ends of said side marginal members relative to the rear ends of said rear end portions of said second side members and with said rear ends of said side marginal members spaced below said rear end portions of said second side members and abutted against the forward facing sides of the lower end portions of said first opposite side members at locations thereon spaced above said first transverse member, and backrest panel means extending between and supported from said first opposite side members, said second frame member and seat frame means being upwardly swingable, as a unit, and about said axes relative to said first frame member toward a position with said second opposite side members substantially paralleling and closely embracing the remote sides of said first opposite side members therebetween, shoulder strap means extending between and anchored to said first lower and upper transverse members for shoulder mounting of said structure from a person with the rear side of said first frame member opposing the back of the upper torso portion of said person.

2. The structure of claim 1 wherein said seat panel and backrest panel means each comprise a flexible panel.

3. The structure of claim 1 wherein said shoulder strap means include opposite side adjustable size loop straps anchored relative to opposite end portions of said upper and first lower transverse members.

4. The structure of claim 3 wherein said loop straps are anchored relative to said upper and first lower transverse members for longitudinal shifting of said loop straps relative thereto.

5. The structure of claim 1 wherein backrest panel means includes a flexible panel secured to the front side of said backrest panel means defining an upwardly opening pocket.

6. The structure of claim 1 wherein said shoulder strap means include opposite side adjustable size loop straps anchored relative to opposite end portions of said upper and first lower transverse members, said loop straps and upper transverse member including coacting means operative to vary the spacing between said loop straps at said upper transverse member.

7. The structure of claim 6 wherein said upper transverse member is substantially inflexible in an upright plane, but reasonably flexible in a horizontal plane for conforming to the transverse curvature of the back of a user.

8. A chair/backpack frame structure including first and second frame members and seat frame means, said first frame member being disposed in upstanding position, having front and rear sides and defining a backrest and a rear leg assembly, said second frame member being generally horizontal and defining opposite side armrests and a front leg assembly, said first frame member including first elongated and generally parallel upright opposite side members, a first lower transverse member extending between and interconnecting the lower end portions of said first side members and an upper transverse member extending between and interconnecting the upper end portions of said first side members, said second frame member including second elongated, generally parallel front-to-rear extending and rearwardly and upwardly inclined arm rest defining opposite side members, said second side members each including integral relatively angulated front and rear end portions defining a rearwardly and downwardly opening included angle of less than 180°, a second lower transverse member extending between and connecting ends of said front-to-rear extending second side members, said second side members being spaced apart to receive said first side members therebetween, first anchor means anchoring the rear ends of said second side members to the outer sides of the corresponding first side members centrally intermediate said first frame member upper and lower transverse members, said seat frame means being horizontally disposed and including a pair of elongated opposite side front-to-rear extending side marginal members and a seat panel extending therebetween and supported therefrom, second anchor means anchoring forward portions of said side marginal members spaced rearward of the forward ends thereof between said front end portions of said second side members centrally intermediate the upper and lower extremities of said front end portions and above said second lower transverse member, third anchor means anchoring the rear ends of said side marginal members relative to the rear ends of said rear end portions of said second side members and with said rear ends of said side marginal members spaced below said rear end portions of said second side members, and backrest panel means extending between and supported from said first opposite side members, shoulder strap means extending between and anchored to said first lower and upper transverse members for shoulder mounting of said structure from a person with the rear side of said first frame member opposing the back of the upper torso portion of said person.

9. The structure of claim 1 wherein said shoulder strap means include opposite side adjustable size loop straps anchored relative to opposite end portions of said upper and first lower transverse members.

10. The structure of claim 9 wherein said loop straps are anchored relative to said upper and first lower transverse members for longitudinal shifting of said loop straps relative thereto.

* * * * *